(12) United States Patent
Kraus et al.

(10) Patent No.: US 6,310,320 B1
(45) Date of Patent: Oct. 30, 2001

(54) DUAL OPERATOR PHASE CONTROL ENGINE DRIVEN WELDER

(75) Inventors: David Kraus; Thomas Bunker, both of Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/227,486

(22) Filed: Jan. 7, 1999

(51) Int. Cl.[7] ...................................................... B23K 9/10
(52) U.S. Cl. ...................................... 219/133; 219/130.33
(58) Field of Search ............................... 219/133, 130.31, 219/130.32, 130.33, 134, 137 PS (56) References Cited

U.S. PATENT DOCUMENTS

| | | |
|---|---|---|
| 2,458,658 | 1/1949 | Tyrner . |
| 3,912,980 | 10/1975 | Crump et al. . |
| 3,928,746 | 12/1975 | Ericsson . |
| 3,961,154 | 6/1976 | Ericsson . |
| 4,247,752 | 1/1981 | Stringer . |
| 4,314,195 | 2/1982 | Muter . |
| 4,417,199 | 11/1983 | Jones . |
| 4,465,920 | 8/1984 | Hoyt, Jr. et al. . |
| 4,779,034 | 10/1988 | Shepard . |
| 4,870,248 | 9/1989 | Gilliland . |
| 4,994,646 | 2/1991 | Tabata et al. . |
| 4,999,563 * | 3/1991 | Suzuki ................................. 219/133 |
| 5,166,567 | 11/1992 | Kneisley et al. . |
| 5,250,786 | 10/1993 | Kikuchi et al. . |
| 5,355,075 | 10/1994 | Wilson, III . |
| 5,408,067 | 4/1995 | Crouse . |
| 5,444,214 | 8/1995 | Crouse et al. . |
| 5,578,908 | 11/1996 | Persson . |
| 5,637,246 | 6/1997 | Ikegami et al. . |
| 5,670,070 | 9/1997 | Clark et al. . |
| 5,708,254 | 1/1998 | Ikegami et al. . |
| 5,796,190 | 8/1998 | Takeda et al. . |

FOREIGN PATENT DOCUMENTS

| | | |
|---|---|---|
| 2565517A1 | 6/1985 | (FR) . |
| 2162704B | 3/1988 | (GB) . |
| 8-9609 | 8/1996 | (JP) . |
| 1796370 | 11/1990 | (RU) . |
| 2009808 | 8/1991 | (RU) . |
| WO 81/01261 | 10/1980 | (WO) . |

OTHER PUBLICATIONS

Miller The Power of Blue, Dimension, 302,452(60Hz), 372,562, (50/60 Hz) Owner's Manual.
Miller The Power of Blue, Blue 400D, Owner's Manual, Aug. 1998.
DualWeld™400 BLW–400SSW Instruction & Parts Manual Ref.No. 7960500.
XMT 304 4–Rack and 6–Rack, Miller The Power of Blue, Dec. 1996.
Mark VI, Miller The Power of Blue, Oct. 1998.
BLW–400SSW, DC Welder/AC Generator.
DualWeld™400 Model BLW–400SSW Repair Manual, 06/96, DC Welder/AC Generator.

* cited by examiner

Primary Examiner—Clifford C. Shaw
(74) Attorney, Agent, or Firm—George R. Corrigan (57) ABSTRACT

A method and apparatus for providing welding power includes two power sources (first and second), each having an output. A linking circuit selectively connects the power sources in one of an independent mode (such that each is connected to a separate welding output whereby the first welding output is independent of the second welding output) or a combined mode (such that the power sources are connected in parallel and connected to one welding output whereby the outputs of the first power source and second power source are combined). A controller includes a mode selector to allow the user to select between the independent mode and the combined mode. Also, the controller includes a master output magnitude selector, which is a single selector, that controls the magnitude of the output of both power sources when the user has selected the combined mode. The power sources can be operated in a CV or CC mode when independent, or a CC mode when combined. A load compensation circuit compensates for the voltage droop in the output of the generator.

29 Claims, 5 Drawing Sheets

DUAL OPERATOR PHASE CONTROL ENGINE DRIVEN WELDER

FIELD OF THE INVENTION

The present invention relates generally to the art of welding machines. More specifically, it relates to welding machines having two power supplies, and two welding outputs.

BACKGROUND OF THE INVENTION

Many different types of welding machines have been used in the prior art. One such prior art welding machine includes a full wave, three-phase, phase controlled welding power supply. For example, the Miller Dimension™ series of welding machines use a three-phase input and provide a constant current (CC) or a constant voltage (CV) output.

Another prior art welding machine is the Miller Big Blue™ 400D welding machine, which is an engine driven welding generator, and can also be operated in a CC output or CV output (with an added module). The output of this welding generator can be used directly to stick weld, or to provide power to a wire feeder for MIG welding.

Some engine driven welding machines include two power supplies driven by a single engine/generator. One example of this is the MQ Power Dualweld 400™. Generally, such dual output welding machines include the ability to select between an independent and combined mode. In the independent mode output power from the power supplies is provided independently to two pairs of output studs, and the machine effectively acts as two independent welding power supplies (both connected to a single generator). The controller includes two current magnitude selectors, one associated with a first output, and the other associated with the second output.

In the combined mode the outputs of both power supplies are combined, or placed in parallel, to form a single welding output. Thus, in this mode, the maximum output is twice that of the output in the independent mode of operation.

There are several drawbacks with the prior art dual output machines. First, when operating in the combined (parallel) mode, two output controls are used in the prior art to control a single output. This is because the output control for each power supply continues to control its respective power supply, even though the outputs are being combined to a single welding output. Thus, to balance the output between the two power supplies (which reduces the likelihood of overheating), one must adjust both output selectors to be in the same position.

Another disadvantage of dual output machines is that when operating in the combined (parallel) mode a CV output cannot be provided because the power supplies are parallel, and might not share the current. The prior art overcomes this problem by not providing a CV output in dual output, phase controlled, machines (even when the machine is operating in the independent mode).

Another prior art dual welding machine includes a generator used to power one or more inverters. The inverters are operated independent of one another, and cannot have their outputs combined to provide a relatively greater magnitude output in CV mode.

Accordingly, a dual output welding machine that provides for a single control of the output when operating in the combined mode is desirable. Additionally, such a welding machine will preferably be capable of providing a CV output when operating in the independent mode.

Many engine driven/generator welding power supplies have a drooping VA curve, wherein as the current increases, the output from the weld windings decreases. Accordingly, an engine driven/generator welding power supply that compensates for a drooping VA curve, by increasing the voltage when the current increases, is desirable.

SUMMARY OF THE PRESENT INVENTION

According to a first aspect of the invention a welding machine includes two power sources (first and second), each having an output. A linking circuit selectively connects the power sources in an independent mode such that each is connected to a separate welding output, whereby the first welding output is independent of the second welding output. Also, the linking circuit can selectively connect the power sources in a combined mode such that the power sources are connected in parallel and connected to one welding output, whereby the outputs of the first power source and second power source are combined. A controller is connected to the linking circuit. The controller includes a mode selector to allow the user to select between the independent mode and the combined mode. Also, the controller includes a master output magnitude selector, which is a single selector, that controls the magnitude of the output of both power sources when the user has selected the combined mode.

A second aspect of the invention is an engine and generator driven welding machine that includes first and second phase controlled power sources, with first and second welding outputs. A linking circuit is disposed to select one of a CC output and a CV output. A controller is connected to and controls the linking circuit such that the user may select between the CC output and the CV output.

A third aspect of the invention is an engine, a generator (including a rotor) connected to and driven by the engine, and a phase controlled power source connected to receive power from the generator. A controller is connected to the power supply and the generator, and includes a load compensation circuit to control the field current in the rotor.

The controller includes a slave output magnitude selector which controls the output of the second power source when the independent mode is selected and the master output magnitude selector controls the magnitude of the output of the first power source when the independent mode is selected, in another embodiment.

The controller includes a master magnitude circuit and a slave magnitude circuit in another embodiment. The master output magnitude selector provides an input to the master magnitude circuit in either mode, and the master output magnitude selector provides an input to the slave magnitude circuit only when the combined mode is selected. The slave output magnitude selector provides an input to the slave magnitude circuit when the independent mode is selected in yet another embodiment. The magnitude selectors includes master potentiometers in another variation.

The power sources receive power from an engine and generator in one embodiment. The generator includes a rotor, and wherein the controller includes a load compensation circuit to control the field current in the rotor in another version.

The power sources are phase controlled, full wave, and/or three phase power sources in various embodiments. Also, the power sources may provide a CC output when in the combined and independent modes, and may provide a CV output when in the independent mode in another embodiment.

In yet another embodiment the linking circuit includes a switch to select between the CV output and the CC output.

The CV/CC switch is controlled by the controller. Also, a mode select switch to select between independent and combined modes. The mode switch is controlled by the controller. The controller controls the switches such that if the CV output is selected the second switch cannot implement the combined mode.

A disable circuit is provided in another embodiment and it disables the output when the combined mode is selected and a CV output is selected in another embodiment.

Another aspect of the invention is a method of providing welding power and includes providing power from a first source and a second source. The power sources are selectively connected in an independent mode in which the power from the first source is provided to a first output and the power from the second source is provided to a second output, whereby the first output is independent of the second output, or they are selectively connected in a combined mode in which the power from the first source is provided to the first output and the power from the second source is provided to the first output, whereby the outputs of the first power source and second power source are combined. The magnitude of both power sources are controlled in response to a single user controlled selector, when in the combined mode.

Another aspect is a method of providing welding power comprising power from a first phase controlled power source and a second phase controlled power source. The sources are controlled to select one of a CC output and a CV output in response to a user input.

Yet another aspect is a method of providing welding power comprising generating power and providing it to a first phase controlled power source. The power for the power source comes from a generator. The field current in the generator is controlled by compensating for the output load.

Other principal features and advantages of the invention will become apparent to those skilled in the art upon review of the following drawings, the detailed description and the appended claims.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to a particular power supply, control circuit and generator, it should be understood at the outset that the invention can also be implemented with other circuits, power supplies and generators, or with one or more of these components omitted. For example, rather than using the potentiometers and analog circuits described below, the invention could be implemented with digital circuits and digital inputs, or a combination of digital and analog circuitry.

The present invention is implemented with a dual output welding machine powered by an engine/generator in the preferred embodiment. The welding machine includes two power supplies, each of which is similar to the Miller phase controlled Dimension™ series, or the Miller Big Blue™ 400D. A generator such as that used in the Miller Big Blue™ 400D is used in the preferred embodiment, but with one stator and two welding windings, one for each of the two power supplies. The welding windings are magnetically in parallel (and thus the two power supplies are in phase with one another), but the welding windings are electrically isolated in the generator. One of the power supplies is referred to as the master power supply, and the other as the slave power supply.

The two power supplies may be operated in a combined mode, where the outputs are combined into a single welding output (the master output). Additionally, the two power supplies may be operated in an independent mode, where two independent welding outputs are provided. In the independent mode the welding machine acts as two separate, independent welding machines, powered by independent windings on the same generator.

The welding machine of the present invention includes a single controller that controls both power supplies in the preferred embodiment. The controller includes the output control, and may include the field current control. Alternatively, the field current control may be in a separate controller.

Generally, the controller controls the output of each power supply consistent with the prior art. The controller includes a CV/CC selector to select between CV and CC output. The magnitude of the output is controlled using feedback and a setpoint, and adjusting the magnitude of the output in response to differences therebetween. The setpoint is derived from the setting of output magnitude selectors, which are potentiometers (one per power supply) on the front panel in the preferred embodiment. One potentiometer is the master output magnitude selector and controls the master power supply, and the other is the slave output magnitude selector and controls the slave power supply when the welding machine is operating in the independent mode.

The controller also includes, in accordance with this invention, a mode select switch to select between the combined mode and the independent mode of operation. (As used herein, switch refers to one or more switches commonly controlled). When the welding machine is operating in the combined mode the master output magnitude selector provides the setpoint for both power supplies, thus causing the load to be generally balanced between the two power supplies. Also, the controller includes a disable circuit that disables the output when the user selects a CV output and the combined mode of operation.

The controller of the present invention includes two control sub-circuits, one for the slave power supply and slave output, and one for the master power supply and master output. Each sub-circuit generally uses the circuitry of the Miller Dimension™ prior art controller, with added circuitry to allow the user to select between the combined mode and the independent mode. Circuitry that disables the CV output capability when the combined mode is selected is also included. A feedback circuit is included to compensate for a drop in voltage from the weld windings when the output current is increased.

Figure 1:
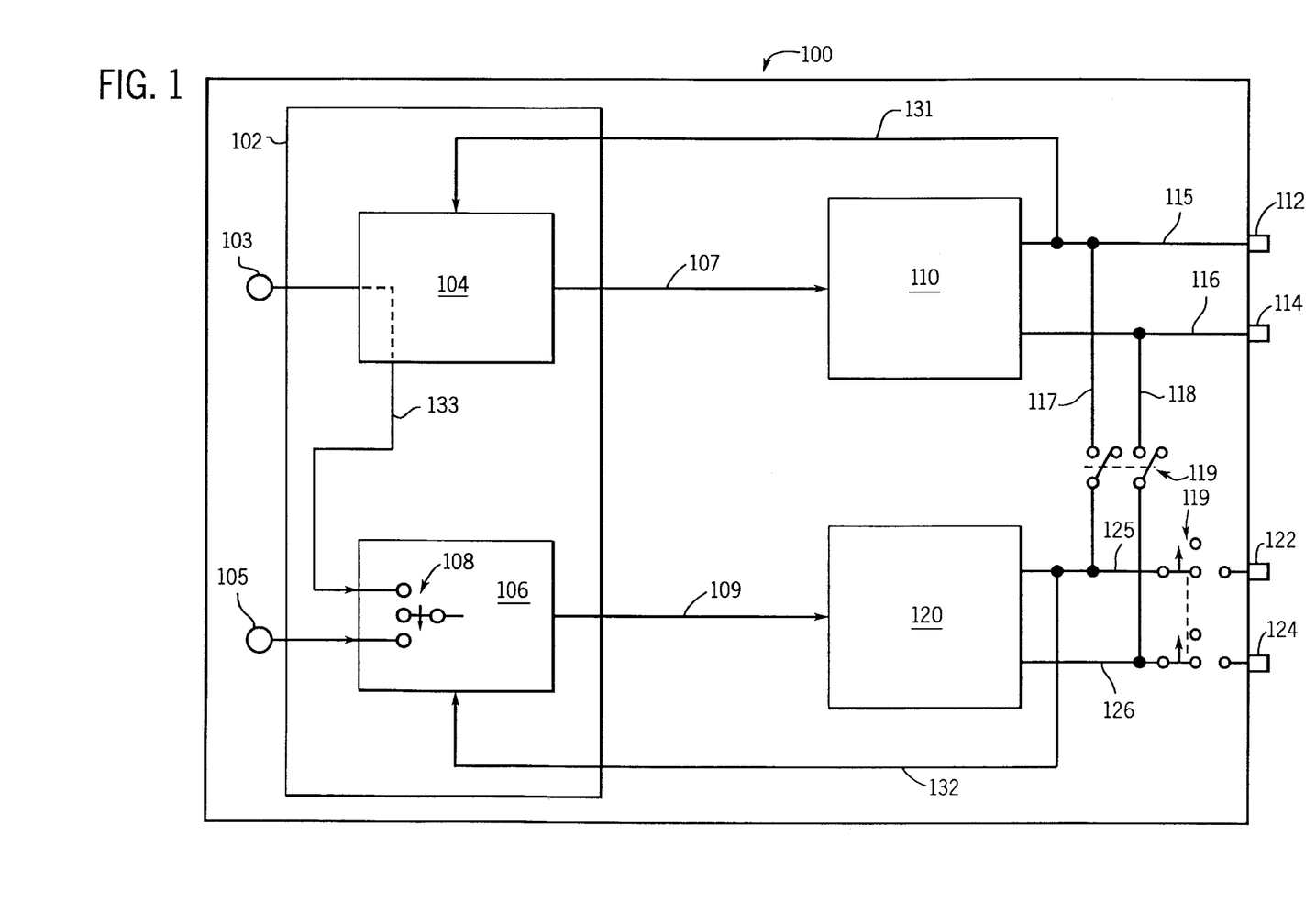
FIG. 1 is block diagram of the preferred embodiment.

Referring now to FIG. 1 a block diagram of a welding machine 100, constructed in accordance with the preferred embodiment is shown. Welding machine 100 includes a controller 102, including a master controller 104 and a slave controller 106, a master output magnitude selector 103, a slave output magnitude selector 105, a master power supply 110, a slave power supply 120, master output studs 112 and 114, and slave output studs 122 and 124. An engine/generator, such as a Miller Big Blue™ 400D is not shown.

Master output magnitude selector 103 may be a potentiometer that provides an input signal as a setpoint to master controller 104. Master controller 104 also receives a feedback signal on line 131, indicative of the output of power supply 110. Master controller 104 compares the setpoint to the actual output, in a manner well known in the art, and adjusts the command signals to power supply 110, to increase or decrease the output of power supply 110 as needed.

Similarly, slave output magnitude selector 105 may be a potentiometer that provides an input signal as a setpoint to slave controller 106. The slave controller 106 also receives a feedback signal on line 132, indicative of the output of slave power supply 120. Slave controller 106 compares the setpoint to the actual output in a manner well known in the art, and adjusts the command signals to slave power supply 120 to increase or decrease the output of power supply 120 as needed.

The master setpoint is also provided on a line 133 to slave controller 106. A switch 108 within slave controller 106 is used to select between the master setpoint and the slave setpoint. The master setpoint is used when welding machine 100 is operated in the combined mode, and the slave setpoint is used when welding machine 100 is operated in the independent mode.

The output of master power supply 110 is provided on lines 115 and 116 to master output studs 112 and 114, also called the master welding output (as used herein welding output refers to the work and electrode terminals). Similarly, the output of slave power supply 120 is provided on lines 125 and 126 to slave output studs 122 and 124, also called the slave welding output. A pair of lines 117 and 118, along with a switch 119 are used to place welding machine 100 in one of the combined and independent modes of operation. Switch 119 opens lines 117 and 118 in one state, thus preventing the output of slave power supply 120 from being provided to master output studs 112 and 114. When switch 119 open lines 117 and 118 it also closes lines 125 and 126, thus connecting the output of slave power supply 120 to slave output studs 122 and 124.

Conversely, when switch 119 closes lines 117 and 118 (and opens lines 125 and 126) the output of slave power supply 120 is provided to master output studs 112 and 114 (and not to slave output studs 122 and 124). Switches 119 and 108 are controlled in tandem, so that when the combined mode is selected slave controller 106 receives its setpoint from master output magnitude 103, and slave power supply 120 provides its output to master output studs 112 and 114.

The circuitry of controller 102 in general, such as that which controls the current and/or voltage output magnitudes, will not be described in detail herein, because that circuitry is the circuitry of the Miller Dimensions 302 prior art welding machine (or may be taken from other prior art machines). However, the additional circuitry and changes to the circuitry related to this invention (described generally above) will be described below with reference to specific circuit diagrams.

Figure 2:
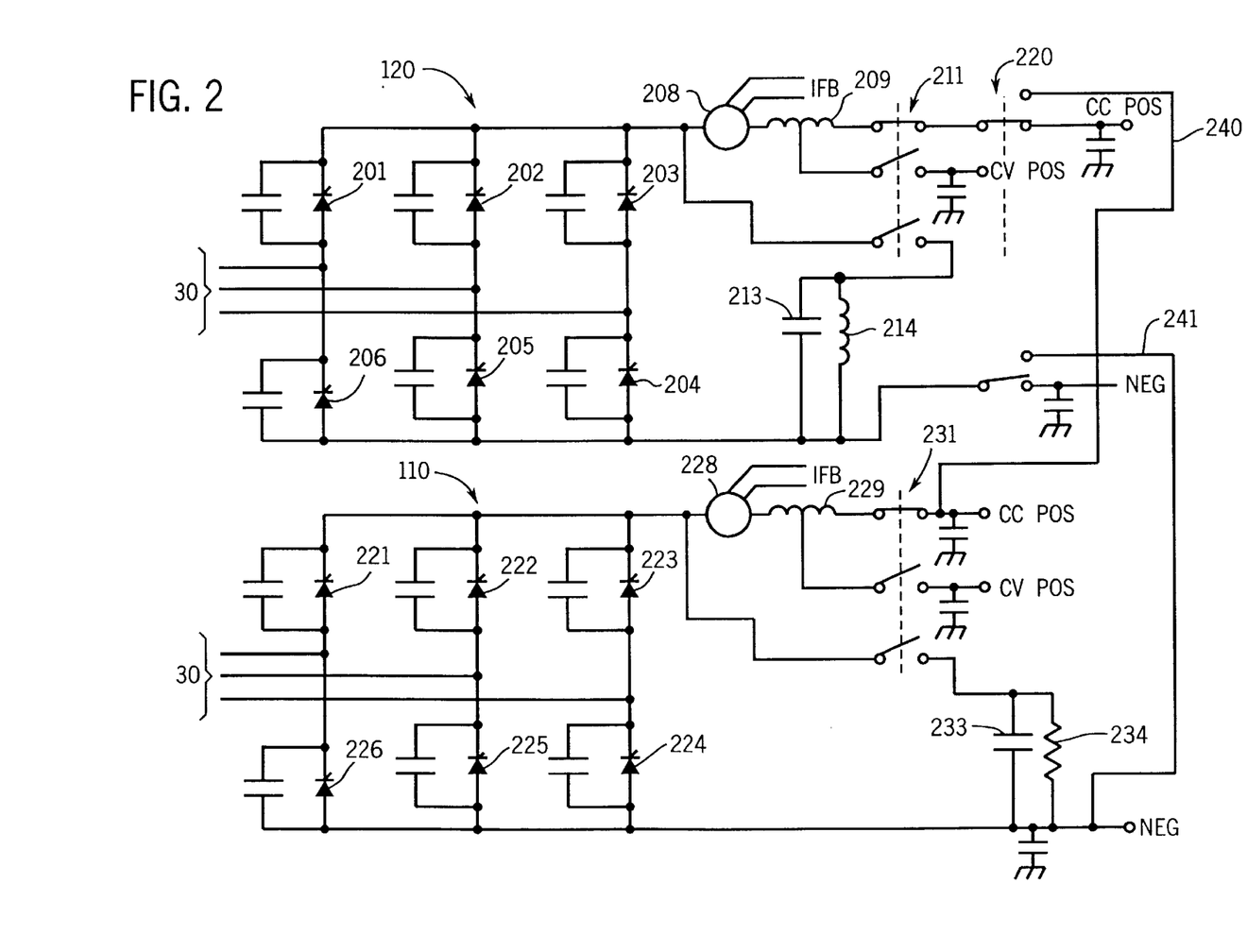
FIG. 2 is a circuit diagram of the master and slave power supplies of FIG. 1.

Master power supply 110 and slave power supply 120 are shown in FIG. 2. Master power supply 110 receives a three-phase input into a six SCR bridge (comprised of SCR's 221 through 226). Each SCR has a snubber capacitor associated therewith. The SCR's are controlled in a manner consistent with the prior art. A current feedback device 228 (such as an isolated Hall device) is used to provide current feedback to master controller 104.

A switch 231 is used to select between CC and CV output. When CC output is selected the output of the SCR bridge is provided through an inductor 229 to the CC positive output. When CV output is selected the output is provided through a tap on inductor 229 to the CV positive output. Also, for a CV output ripple is reduced by connecting a capacitor 233 from the positive bus to the negative bus (a discharge resistor 234 is also provided).

Slave power supply 120 is similarly configured, and includes a six SCR bridge comprised of SCR's 201 through 206 (including associated snubber capacitors). The output of the SCR bridge is provided through a current feedback device 208, and a CC/CV output switch 211. The CC/CV output switch 211 operates as does switch 231 in the master power supply 110.

Slave power supply 120 also includes a switch 220 which selects either the combined or separate mode of operation. (This switch may be used to implement switch 119 of FIG. 1). When the user selects the combined mode of operation switch 220 is in the "up" position, and the output of slave power supply 120 is provided to the outputs studs for master power supply 110 through lines 240 and 241. When the user selects the separate mode of operation switch 220 is as shown in FIG. 2, and the output of slave power supply 120 is connected to the slave CC positive output. The switches used to select the output as CC or CV, and the mode as combined or independent, may be considered to form a linking circuit. (As used herein, linking circuit is the circuit, including switches, used to select between modes and/or type of output).

Figure 3:
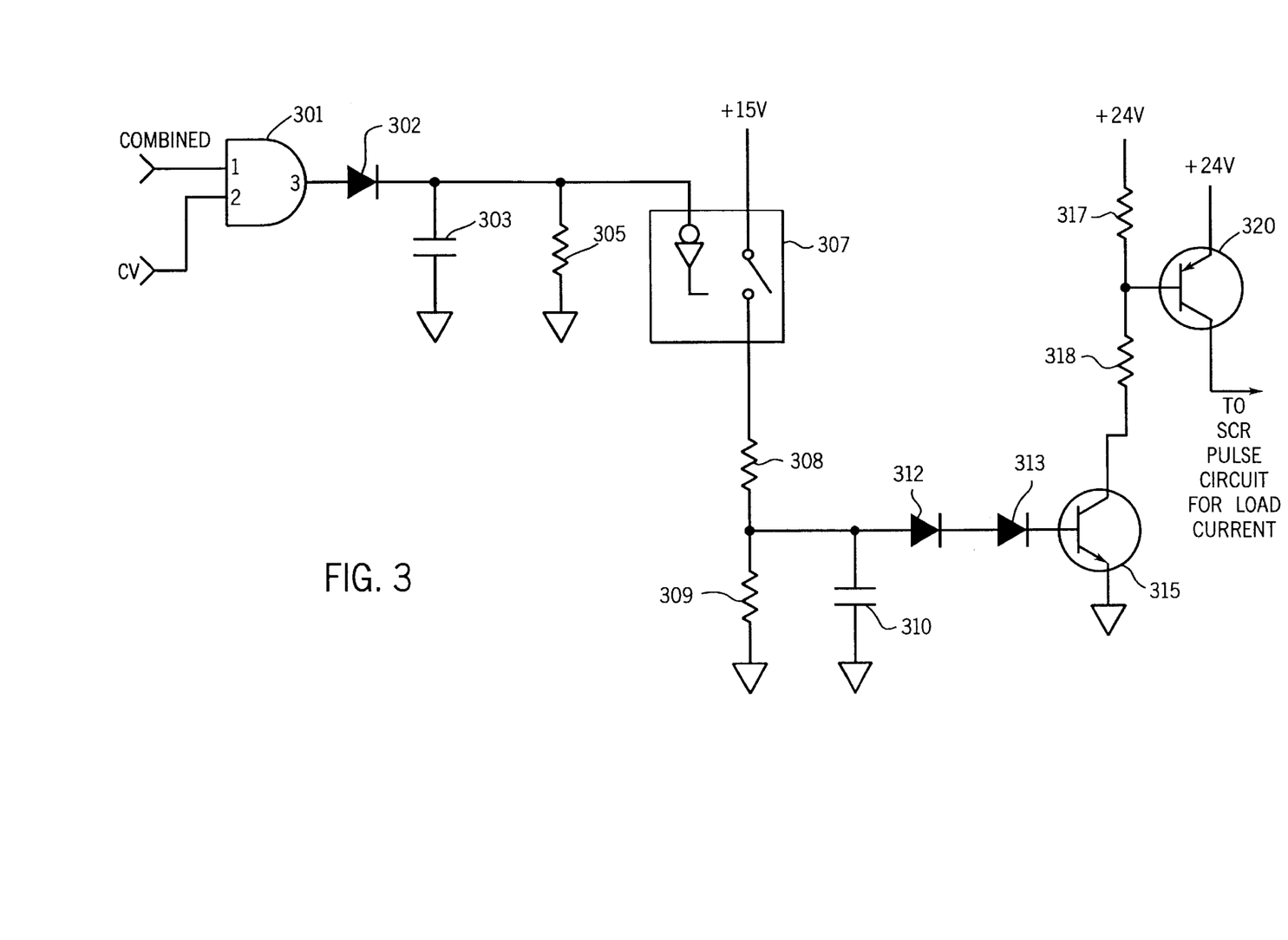
FIG. 3 is a circuit diagram of the circuit used in the preferred embodiment to disable the output when CV output and combined mode are selected by the user.

Given the relative positions of switches 211 and 220, the combined mode and a CV output are mutually exclusive. Additionally, controller 102 provides that if the user selects CV output and combined mode, the SCR firing pulses (for the master and slave power supplies) are disabled, as shown in FIG. 3. The disable circuit, includes an AND gate 301 which receives inputs signals indicative of whether the combined mode is selected and whether a CV output is selected. When combined mode is selected the input to pin one of AND gate 301 is high, and when CV output is selected the input to pin 2 AND gate 301 is high. Thus, when both combined mode and CV output are selected, the output of AND gate 301 is high.

The output of AND gate 301 is provided to a diode 302 (and capacitor 303 and resistor 305) to the control input of an analog switch 307. When the output of AND gate 301 is high, analog switch 307 is caused to be open. When analog switch 307 is open, the voltage supply for the firing pulses for the SCR's is cut off. The circuitry which accomplishes this include resistors 308 and 309, capacitor 310, diodes 312 and 313, transistors 315 and 320, and resistors 317 and 318.

The circuit of FIG. 3 is included in both master controller 104 and slave controller 106. Thus, the output of both slave power supply 120 and master power supply 110 are disabled when the user selects combined mode and CV output. This ensures that the machine is protected from unequal currents provided by the power supplies, and protects the user from unexpected outputs in the event the user selects combined mode and CV output.

Prior art controllers, such as that found in the Miller Dimension™ 302, typically receive a setpoint (derived from a front panel potentiometer), a feedback signal, and other control signals, in a summing junction, wherein the signals are summed, and a control signal is output in response to the summed signals. The present invention utilizes such a typical control scheme, with the addition that the setpoint input in the slave controller is selected in response to whether or not combined or independent mode of operation is selected.

Figure 4:
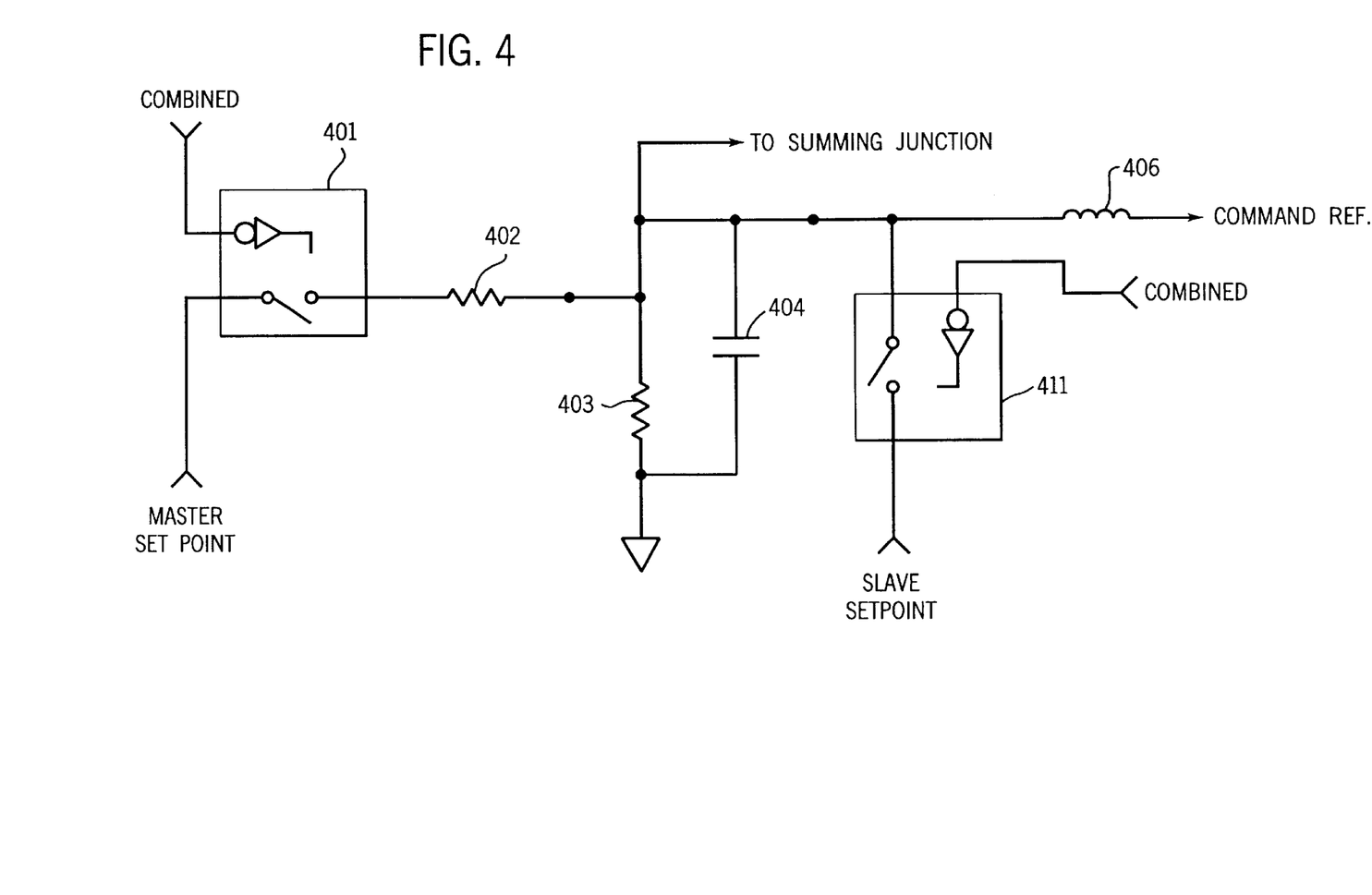
FIG. 4 is a circuit diagram of the circuit used in the preferred embodiment to select between the master and slave setpoints.

The circuitry which is used to select the setpoint input for the slave controller 106 is shown in FIG. 4, and includes a pair of analog switches 401 and 411 (these switches may be used to implement switch 108 of FIG. 1), resistors 402 and 403, a capacitor 404 and an inductor 406. Switches 401 and 411 are controlled in response to the COMBINED input (which is the same as the COMBINED input on FIG. 3 to pin one of AND gate 301).

When the COMBINED input is high, indicating that the combined mode of operation has been selected, switch 401 is closed, connecting the master setpoint through resistor 402 to the output leading to the summing junction. Additionally, when the COMBINED input is high, switch 411 is opened, thus disconnecting the slave setpoint from the summing junction.

Conversely, when the COMBINED input is low, indicating that the separate mode is been selected, the master setpoint is disconnected by having switch 401 open, and the slave setpoint is connected by having switch 411 closed. Thus, the appropriate selection for the setpoint for the slave power supply and slave controller is accomplished by the circuit shown in FIG. 4.

Generally, an engine/generator output has a reduced voltage (droop) as the load current increases. This is compensated for in the present invention by feeding back the current output of the master and slave power supplies. When the output of either increases, the feedback increases the field current in the rotor, which causes the voltage in the weld windings to increase.

Figure 5:
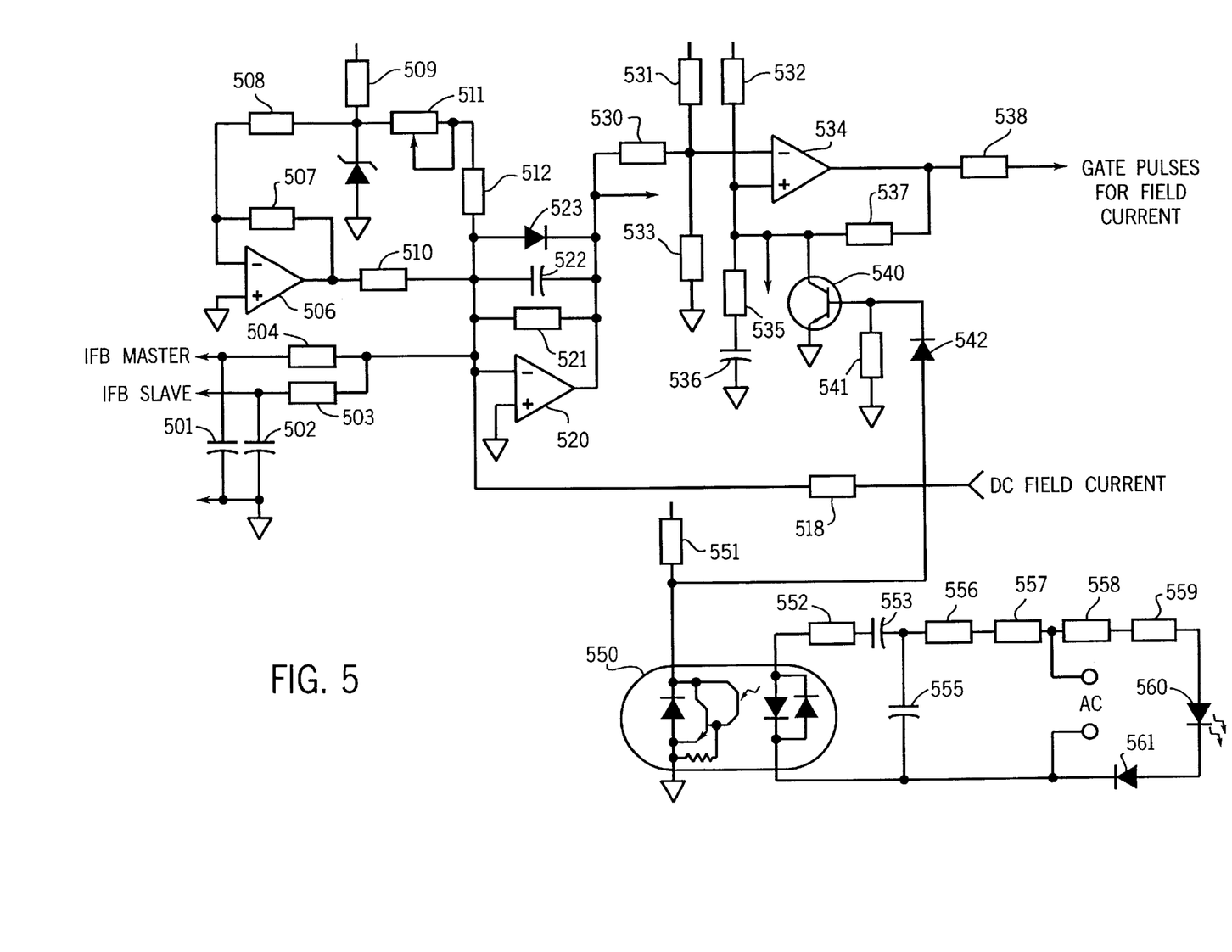
FIG. 5 is a circuit diagram of the circuit used in the preferred embodiment to compensate for the droop in the output of the engine/generator.

FIG. 5 shows the circuit which provides the load compensation feature (i.e. compensating for the voltage droop) for the field current in the engine/generator. The load compensation circuit receives the output current of master power supply 110 through a resistor 504 (61.9K ohms), and receives the output current of slave power supply 120 through a resistor 503 (61.9 k ohms). A pair of capacitors 501 and 502 are provided to reduce the noise in the feedback signals. The positive feedback signals are obtained from current feedback devices 208 and 228. Other than these signals, the field current regulator operates in a conventional manner.

The feedback signals are summed by an op amp 520, which also receives a signal indicative of the DC field current through a resistor 518 (1K ohm). Additionally, a voltage offset in the DC field current circuit is compensated for by an op amp 506, and associated circuitry resistors 507 (10K ohms), 510 (5K ohms), and 508 (8K ohms). Resistor 509 (2K ohms) and a zener diode form a voltage reference for the field current setpoint provided to op amp 520 through adjustable resistor 511 and a resistor 512. The setpoint provides for the correct three phase input voltage to the master power supply 110 and the slave power supply 120. Inverting op amp 520 has a feedback resistor 521 (332 k ohms), a capacitor 522 and a diode 523. These components provide a gain of about 5.36 for op amp 520.

The output of op amp 520 is provided to a comparator 534 through a resistor 530 (1K ohm). Comparator 534 has associated resistors 531 (30.1K ohms), 533 (3.92K ohms), 532 (243K ohms), 535 (47.5 ohms), a capacitor 536, a resistor 537 (681K ohms) and a resistor 538 (3.32K ohms). The output of op amp 534 is used to initiate the gate pulses which trigger the SCR's that control the field current.

Thus, when an increased current is sensed by current feedback devices 208 or 228, the input to op amp 520 is increased. The output of op amp 520 is connected to comparator 534, and causes the output of comparator 534 to begin earlier in time. This causes an increase in the field current in the rotor, which in turn causes the voltage in the weld windings to increase. This increase in voltage compensates for the voltage droop normally caused by an increased current output. A feed forward circuit may be used in other embodiments.

The start of the gate pulses are synched with the start of the AC voltage through a transistor 540, a resistor 541, a diode 542, a resistor 551 and an opto-coupler 550. Opto-coupler 550 is connected to the AC signal through a plurality of resistors 556, 557, and 552, and capacitors 553 and 555. The beginning of the AC waveform is sensed by the resistor network and causes opto-coupler 550 to turn on transistor 540. This grounds the input to the non-inverting input of comparator 534, which causes the starting of the gate ramp to be in sync with the AC voltage. Resistors 558 and 559, and diode 561 provide the ac input to an LED 560 for diagnostic purposes.

Numerous modifications may be made to the present invention which still fall within the intended scope hereof. Thus, it should be apparent that there has been provided in accordance with the present invention a method and apparatus for welding that includes a dual output machine, with a single output magnitude selector that controls both the slave and master power supplies when in the combined mode. Also, the welding machine includes a CV capability when operating in the independent mode, and includes circuitry to disable the CV output when a combined output is selected. A load compensation circuit in the field current regulator is also provided, which compensates for the droop in output voltage typical in engine/generator machines. Thus, this fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A welding machine comprising:
   a first power source;
   a second power source;
   a first welding output;
   a second welding output;
   a linking circuit, disposed to selectively connect the first and second power sources in an independent mode such that the first power source is connected to the first welding output, and the second power source is connected to the second welding output, whereby the first welding output is independent of the second welding output, and further to selectively connect the first and second power sources in a combined mode such that the first power source output and the second power source output are connected in parallel and connected to the first welding output, whereby the outputs of the first power source and second power source are combined; and a controller, connected to the linking circuit, wherein the controller includes a mode selector to allow the user to select between the independent mode and the combined mode, and wherein the controller further includes a master output magnitude selector, which is a single selector, that controls the magnitude of the output of both the first power source and the second power source when the user has selected the combined mode.

2. The welding machine of claim 1, wherein the controller further includes a slave output magnitude selector which controls the output of the second power source when the independent mode is selected, and wherein the master output magnitude selector controls the magnitude of the output of the first power source when the independent mode is selected.

3. The welding machine of claim 2, wherein the controller further includes a master magnitude circuit and a slave magnitude circuit, and further wherein the master output magnitude selector provides an input to the master magnitude circuit when the independent mode or the combined mode is selected, and further wherein the master output magnitude selector provides an input to the slave magnitude circuit when the combined mode is selected.

4. The welding machine of claim 3, wherein the slave output magnitude selector provides an input to the slave magnitude circuit when the independent mode is selected.

5. The welding machine of claim 4, wherein the master output magnitude selector includes a master potentiometer, and further wherein the slave output magnitude selector includes a slave potentiometer, and wherein the master and slave potentiometers provide set points.

6. The welding machine of claim 1, wherein the first power source and the second power source receive power from an engine and generator.

7. The welding machine of claim 6, wherein the generator includes a rotor, and wherein the controller includes a load compensation circuit to control a field current in the rotor.

8. The welding machine of claim 6, wherein the first power source and the second power source are phase controlled power sources.

9. The welding machine of claim 8, wherein the first power source and the second power source are full wave, three phase power sources.

10. The welding machine of claim 8, wherein the first power source and the second power source may provide a CC output when in the combined and independent modes, and may provide a CV output when in the independent mode.

11. The welding machine of claim 10, wherein the linking circuit includes a first switch, controlled by the controller, to select one of the CV output and the CC output, and a second switch, controlled by the controller, to select one of the independent and combined modes, wherein the first switch is disposed such that if the CV output is selected the second switch cannot implement the combined mode.

12. The welding machine of claim 10, wherein the controller includes a disable circuit that disables the output when the combined mode is selected and a CV output is selected.

13. An engine and generator driven welding machine comprising:

a first phase controlled power source;

a second phase controlled power source;

a first welding output connected to the first phase controlled power source;

a second welding output connected to the second phase controlled power source;

a linking circuit, disposed to select one of a CC output and a CV output, and connected to the first and second welding outputs;

a controller, connected to the linking circuit, wherein the controller includes an output selector to allow the user to select between the CC output and the CV output.

14. The welding machine of claim 13, wherein the first power source and the second power source are full wave, three phase power sources.

15. A method of providing welding power comprising:

providing power from a first source;

providing power from a second source;

selectively connecting an independent mode in which the power from the first source is provided to a first output, and connecting the power from the second source is provided to a second output, whereby the first output is independent of the second output;

selectively connecting a combined mode in which the power from the first source is provided to the first output, and connecting the power from the second source to the first output, whereby the outputs of the first power source and second power source are combined; and controlling the magnitude of both power sources in response to a single user controlled selector, when in the combined mode.

16. The method of claim 15, including the step of controlling the magnitude of the first power source in response to the single user controlled selector and controlling the magnitude of the second power sources in response to a second user controlled selector, when in the independent mode.

17. The method of claim 16, including generating power from an engine and generator, and providing the power to the first and second power sources.

18. The method of claim 17, including compensating for the output load by controlling a field current in a rotor.

19. The method of claim 17 including the step of phase controlling the first and second power sources.

20. The method of claim 16, wherein generating includes generating full wave, three phase power.

21. The method of claim 16, including providing one of a CV and a CC output in response to a user selection.

22. The method of claim 21, including disabling the combined mode if the CV output is selected.

23. A method of providing welding power comprising:

generating power and providing it to a first phase controlled power source and a second phase controlled power source;

providing power from the first phase controlled power source;

providing power from the second phase controlled power source;

controlling an output selector to select one of a CC output and a CV output in response to a user input.

24. A welding machine comprising:

a first power source;

a second power source;

a first welding output;

a second welding output;

a linking means for selectively connecting the first and second power sources in an independent mode such that the first power source is connected to the first welding output, and the second power source is connected to the second welding output, whereby the first welding output is independent of the second welding output, and further for selectively connecting the first and second power sources in a combined mode such that the first power source output and the second power source output are connected in parallel and connected to the first welding output, whereby the outputs of the first power source and second power source are combined, wherein the linking means is connected to the first and second power sources; and a controller means for allowing the user to select between the independent mode and the combined mode, and for allowing the user to select the output magnitude with a single selector that controls the magnitude of the output of both the first power source and the second power source, when the user has selected the combined mode, wherein the controller is connected to the linking circuit and the first and second power sources.

25. The welding machine of claim 24, wherein the controller further includes a slave output magnitude selector means for controlling the output of the second power source when the independent mode is selected.

26. The welding machine of claim 24, wherein the first power source and the second power source receive power from an engine and generator means for generating power.

27. The welding machine of claims 26, wherein the generator means includes a rotor, and wherein the controller means includes a load compensation means for controlling a field current in the rotor and compensating for the output load current.

28. The welding machine of claim 27, further including output means for selecting between a CC output when in the combined and independent modes, and for providing a CV output when in the independent mode.

29. An engine and generator driven welding machine comprising:

a first phase controlled power source;

a second phase controlled power source;

a first welding output;

a second welding output;

a linking means for selecting one of a CC output and a CV output, wherein the linking means is connected to the power sources and the welding outputs; and a controller means for allowing the user to select between the CC output and the CV output, wherein the controller means is connected to the linking means.

* * * * *